United States Patent [19]

Hockman

[11] Patent Number: 5,015,127

[45] Date of Patent: May 14, 1991

[54] ARTICLE FEEDER

[75] Inventor: Edward N. Hockman, Auburn Hills, Mich.

[73] Assignee: Clyde Corporation, Rochester, Mich.

[21] Appl. No.: 470,157

[22] Filed: Jan. 25, 1990

[51] Int. Cl.⁵ .................. B25B 23/04; B65G 51/28; B65G 51/22
[52] U.S. Cl. ................................. 406/192; 406/148; 81/430
[58] Field of Search .............. 406/76, 85, 128, 130, 406/148, 149, 192; 224/112, 114, 118; 81/57.37, 430

[56] References Cited

U.S. PATENT DOCUMENTS 3,247,874 4/1966 MacDonald .................. 81/430
4,363,573 12/1982 Ginther et al. ................ 81/430

FOREIGN PATENT DOCUMENTS 0870128 10/1981 U.S.S.R. .................. 227/118

Primary Examiner—Joseph F. Peters, Jr.
Assistant Examiner—Virna Lissi Mojica
Attorney, Agent, or Firm—Barnes, Kisselle, Raisch, Choate, Whittemore & Hulbert

[57] ABSTRACT

Apparatus for feeding articles with a head and a shank one at a time head end first through a conduit to a staking press, driver or other power tool. One article at a time is fed sidewise into an axial passageway and is received on a slide rod with its shank extending into a pilot passage in the rod. The slide rod is moved to an extended position in the passageway which closes the inlet and compressed gas is admitted to the pilot passage to propel the article head first through the conduit. The slide rod is then retracted to open the inlet for receiving another article. The articles are admitted one at a time to the passage by a metering arm driven by a fluid motor.

10 Claims, 2 Drawing Sheets

ARTICLE FEEDER

FIELD

This invention relates to a feeding apparatus and more particularly to an apparatus for feeding articles one at time to a power tool for automatically driving or processing the articles in mass production and assembly line operations.

BACKGROUND OF THE INVENTION

Articles having a head and a shank, such as bolts, screws, studs, rivets and the like, are extremely difficult to rapidly feed generally axially one at time from a succession of articles in generally parallel and side-by-side relationship. Because they have so many edges, such articles are highly susceptible to becoming caught, jammed or hung up in the feeding apparatus. Moreover, difficulty in rapidly feeding such articles one at a time is significantly increased if they must be fed head first to the power tool.

Many devices have been previously devised for rapidly and repetively feeding such articles one at time, but few of such devices have been successful in mass production and assembly operations. However, one device which has been satisfactory and highly commercially successful is disclosed in U.S. Pat. No. 4,363,573 issued on Dec. 14, 1982. This device has a movable metering arm which delivers one article at a time to a pilot passageway from which it is propelled shank end first through a hose to a power tool by a stream of compressed air discharged into the pilot passageway. While this device is highly satisfactory for most applications, it cannot deliver workpieces head end first to a power driver.

BRIEF SUMMARY OF THE INVENTION

In accordance with this invention, from a succession of articles disposed in side-by-side relationship one article at a time is transferred through a housing inlet and onto a slide with its shank received in a pilot passage in the slide. The slide is advanced to close off the inlet and a compressed gas is admitted to the pilot passage to propel the article head first through a hose to deliver it to a power tool. Thereafter, the supply of compressed gas is cut off and the slide is retracted to open the inlet to receive another article in the slide.

The articles are admitted one at a time to the inlet and the succeeding articles restrained preferably by a metering arm having a pair of spaced apart fingers between which each article passes. Preferably, the metering arm and slide are each driven by a fluid actuated ram or cylinder.

Objects, features and advantages of this invention are to provide an article feed apparatus which feeds articles head first, is of greatly simplified design, has few moving parts, significantly decreases the likelihood of articles becoming caught, hung up or jammed when being transferred and fed one at a time, can propel articles a great distance, can feed articles at a high rate of speed, is significantly less expensive to manufacture and assemble, is readily and easily adapted to feeding different size articles, requires relatively little maintenance and repair, and has significantly improved durability, reliability and performance in mass production and assesmbly operations.

BRIEF DESCRIPTION OF THE DRAWINGS

These and other objects, features and advantages of this invention will be apparent from a perusal of the following detailed description, appended claims, and accompanying drawings in which

DETAILED DESCRIPTION OF THE PREFERRED EMBODIMENT

Figure 1:
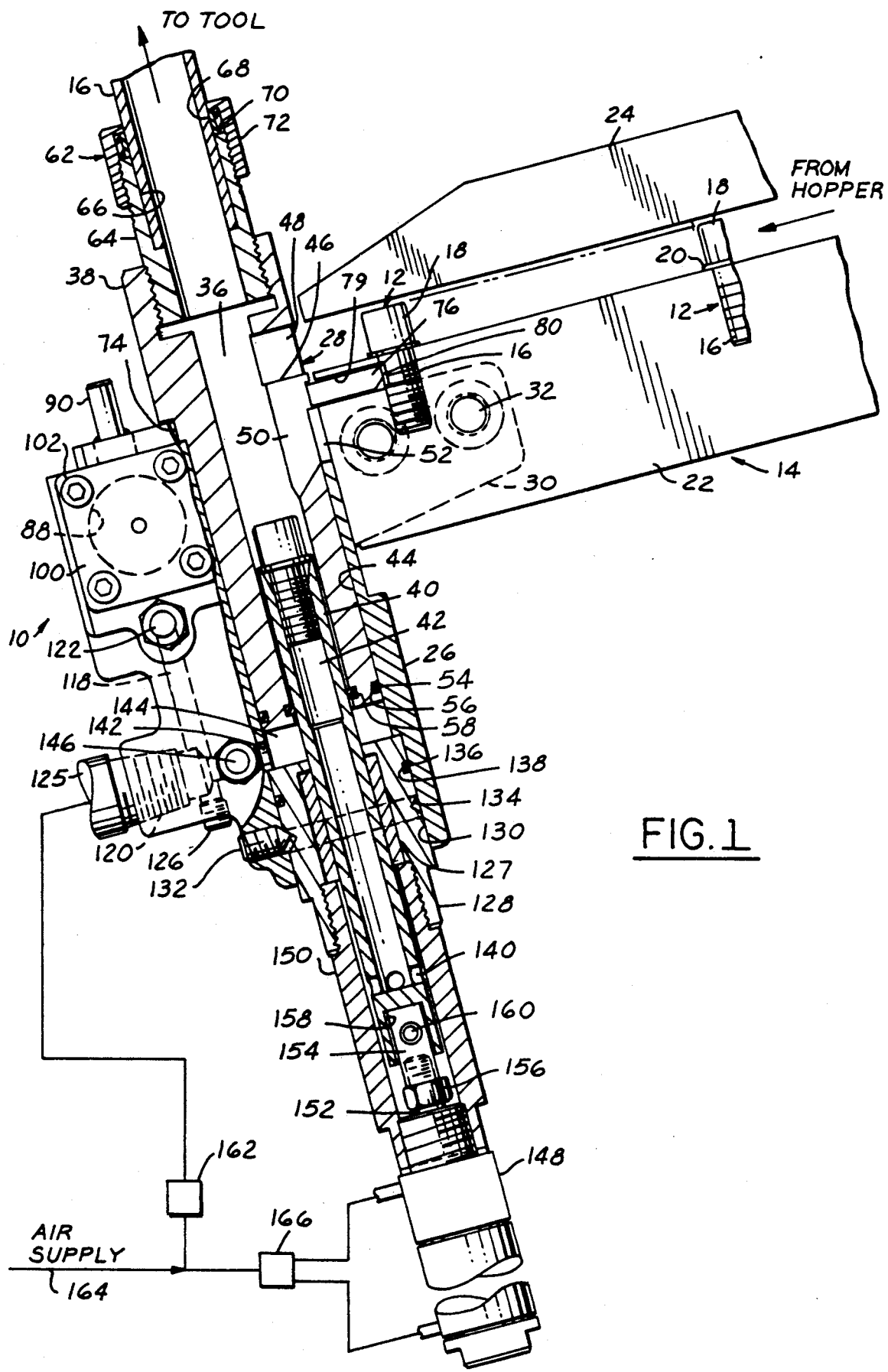
FIG. 1 is a sectional view taken generally on line 1—1 of FIG. 2 of a feed apparatus embodying this invention associated with a track for supplying a succession of articles.

Referring in more detail to the drawings, FIG. 1 illustrates a feed apparatus 10 embodying this invention which receives bolts, screws or studs 12 from a track assembly 14 and propels one stud at a time head first through a tube 16 to a power tool (not shown) such as a driver, staking press or the like. Specifically the stud 12 is a fastener with a threaded shank 16 and an enlarged head 18 with a flange 20. In use, the head of the stud is fixed to a metal plate and an object is secured to the shank by a nut. A staking press forces the head through a metal plate so tht the flange bears on one face of the plate and expands or flares out the free end of the head to bear on the other face to thereby secure the fastener to the plate much like a rivet. The feed apparatus 10 can be used with other fasteners, such as bolts and screws, which need to be supplied to a driver, stake press or other power tool head first.

The track assembly orients a succession of studs in generally side-by-side relationship with their heads abutting one another and their shanks depending and generally parallel to each other. The heads of the studs are received on the upper edges of a pair of parallel and laterally spaced apart rails 22. To prevent the heads from overlapping one another, their vertically upward movement is limited by an overlying retainer bar 24 secured to the rails by brackets (not shown). To insure that the studs will move toward the feeder by gravity, the track assembly is inclined downwardly to the horizontal, preferably at an acute included angle in the range of about 15° to 60°, and preferably about 30°.

The feeder has a housing 26 with an inlet 28 through which one stud at a time is received. The housing is secured to the lower end of the track assembly by a pair of mounting ears 30 each secured to one of the rails 22 by cap screws 32. A stud is transferred by a metering arm 34 into a passageway or bore 36 through an upper sleeve 38 and drops by gravity into the upper end of a slide rod 40 with its shank received in a pilot passage 42 in the slide. The metering arm 34 is removably received and journalled for rotation on the upper sleeve which is received in a bore 44 through the housing and releasably retained therein by a set screw (not shown). This facilitates rapid removal and replacement of the metering arm and upper sleeve to readily adapt the feeder for different size studs or other articles.

Preferably, the diameter of the passageway 36 is about six percent (6%) greater than the maximum diameter of the head of the studs. Each stud is guided into the passageway by shoulders 46 formed by slots 48 and 50 which provide clearance for the head and shank respectively of the stud. To provide clearance for the head, slot 48 has a width and height somewhat greater than the diameter and height respectively of the head. To provide clearance for the shank, the slot 50, and a mating slot 52 in the housing, each have a width and height somewhat greater than the diameter and length repectively of the shank. Preferably, the width of the slot 48 is equal to the diameter of the passageway 36. Airtight seals are provided between the housing and the sleeve and the sleeve and the slide rod by O-rings 54 received in grooves 56 and 58 in the sleeve adjacent its lower end.

The hose 16, through which the studs are propelled, is connected to the upper end of the sleeve 38 by a coupler 62. The coupler has a nipple 64 threaded into the end of the sleeve 38 with a counterbore 66 therein in which an end of the hose is slidably received in generally coaxial alignment with the sleeve passageway 36. The hose is releasably retained in the coupling by a split ring 68 and a backup ring 70 with complementary tapered faces arranged so that the split ring is forced radially inward or compressed into firm engagement with the tube when an end cap 72 is threaded onto the nipple.

Figure 2:
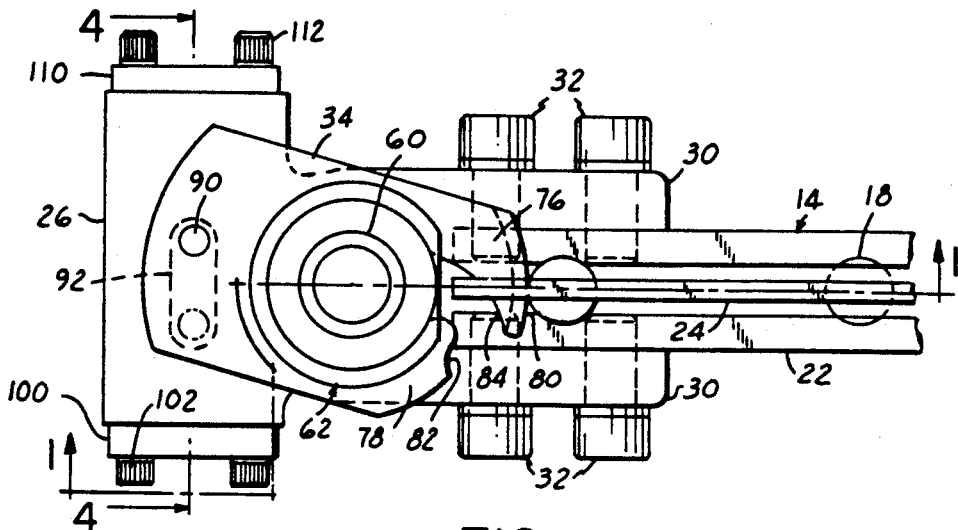
FIG. 2 is a top view of the feed apparatus and track of FIG. 1.

To facilitate rapid removal and replacement of the metering arm 34, it is removably journalled for rotary oscillation on a bearing 74 on the upper sleeve. Transfer of a stud into the feeder is controlled by a pair of generally opposed fingers 76 and 78 of the arm between which the shank of the stud passes. As shown in FIG. 2, in the clockwise position of the metering arm, the finger 76 projects into the space between the rails of the track through clearance slots 79 so that its front abutment face 80 bears on the shank of the leading stud at the lower end of the track assembly, thereby preventing all of the studs from advancing into the feeder inlet 28. When the metering arm is rotated to its counter-clockwise position, finger 76 is retracted from and finger 78 is projected into the space between the rails of the track so that its abutment face 82 bears on the shank of the leading stud, thereby permitting all the studs to advance one position toward the feeder inlet 28 while still preventing studs from entering the inlet. When the metering arm is reverse rotated to return it to its clockwise position (as shown in FIG. 2), finger 78 is withdrawn from the slot between the rails to release the leading stud, and the finger 76 extended into the slot so that its rear cam face 84 strikes the shank of the leading stud with sufficient force to propel it across the guide shoulders 48 through the inlet and into the sleeve passageway 36 where it drops by gravity onto the upper end of the slide rod 40 with its shank received in the pilot 42. This movement of the finger 76 also causes its front abutment face 80 to bear on the shank of the immediately succeeding stud and thereby prevent it and all other succeeding studs from advancing into the feeder inlet 28.

Figure 4:
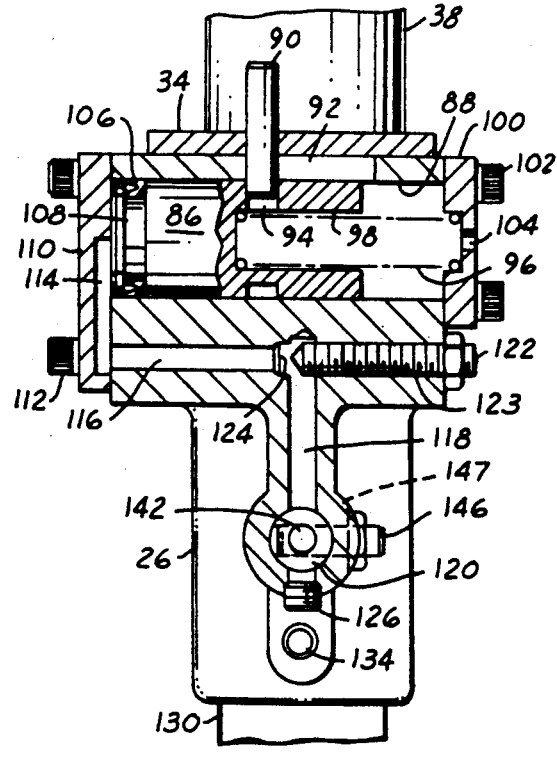
FIG. 4 is a sectional view taken generally on line 4—4 of FIG. 2.

As shown in FIG. 4, the metering arm 42 is driven by a fluid motor having a piston 86 slidably received in a cylinder bore 88 in the housing and operably connected to the arm by a pin 90 fixed to the arm, projecting through a clearance slot 92 in the housing and slidably received in a hole 94 in the piston. The piston, and hence the metering arm, are yieldably biased by a compression spring 96 to the clockwise position to the metering arm (as shown in FIG. 2). One end of the spring is received in a blind hole 98 in the piston and the other end bears on a cover plate 100 secured to the housing by cap screws 102. The spring end of the cylinder housing is bled to the atmosphere through a port 104 in the cover plate. A seal is provided between the cylinder and the piston by a packing seal 106 received in a groove 108 in the piston. The cylinder is closed and sealed by a cylinder head plate 110 secured to the housing by cap screws 112.

The piston 86 is moved against the bias of the spring 96 by a compressed gas admitted to the head end of the cylinder through a groove 114 in the head plate and interconnecting passages 116, 118 and 120 in the housing. The quantity of the compressed gas delivered to the piston can be varied and adjusted by a needle valve 122 received in a threaded passage 123 which cooperates with a seat 124 in the passage 116. Preferably, an inlet fitting 125 is threaded into the passage 120 and a plug 126 is threaded in the end of passage 118.

As shown in FIG. 1, the slide rod is journalled for reciprocation in a bearing 127 carried by a lower sleeve 128 releasably retained in a counterbore 130 in the housing by the cooperation of a set screw 132 in the housing with a V-shaped groove 134 in the lower sleeve. A gas tight seal is provided between the housing bore 44 and the lower sleeve 128 by an O-ring 136 received in a groove 138 in the sleeve.

Figure 3:
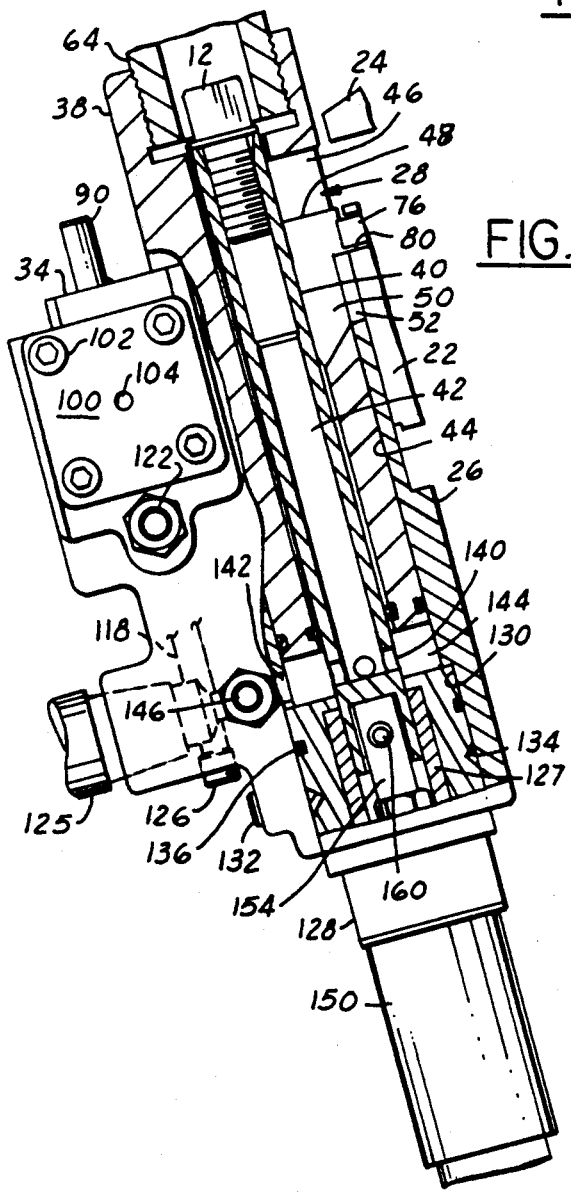
FIG. 3 is a fragmentary view partially in section of the apparatus of FIG. 1 with the slide rod shown in its advanced position and closing the inlet.

As shown in FIG. 3, when the slide rod 40 is fully advanced to close off the feeder inlet 28, the stud which has been advanced with the tube, is propelled out of the feeder through the hose 16 by compressed gas discharged into the pilot passage 42 through inlet ports 140 adjacent its lower end. Compressed gas is supplied to the inlet ports through a passage 142 in the housing and an annular cavity 144 defined by the housing and the upper and lower sleeves 38 and 128. A slide valve is provided by the cooperation of the lower sleeve 128, slide rod 40 and ports 140 which is normally closed and opens to admit compressed gas to the pilot passage 42 for propelling the stud only when the slide rod is advanced sufficiently to close the feeder inlet 28. Fully advancing the slide rod also insures that the head of the stud to be propelled is disposed in the passage outlet or nipple 64 of the tube coupling so that it cannot become hung up on the mechanism of the feed apparatus. The quantity of air supplied to the pilot passage 42 can be varied and adjusted by a needle valve 146 received in a threaded transverse passage 147 in the housing and projecting into the passage 142.

The slide rod is advanced and retracted by a fluid ram or pneumatic cylinder 148 threaded into one end of an adapter 150 the other end of which is threaded into the lower sleeve 128. The slide rod 40 is connected to the piston rod 152 of the cylinder by a coupler 154 threaded onto the free end of the rod and secured thereon by a jam nut 156. The other end of the coupler is received in a blind bore 158 in the slide rod and retained therein by a pin 160 extending through the rod and the coupler.

As shown in FIG. 1, the feed apparatus 10 is normally installed by securing its housing 26 to the lower end of the rails 22, which are inclined to the horizontal so that the studs move by gravity on the rails toward the feed apparatus. The air inlet 125 for the fluid motor driving the metering arm the slide rod passage is connected through a control valve 162, such as a solenoid valve, to a source 164 of compressed gas such as air, which is preferably, although not necessarily, at a working pressure in the range of about 50 to 100 PSIG. The cylinder 148 for advancing and retracting the slide rod 40 is also connected through a control valve 164, such a solenoid valve, to the air supply. To convey the studs to the staking press or other power tool, one end of the flexible hose 16 is connected to the outlet of the feed apparatus and the other end is connected to the stake press for receiving the studs from the feed apparatus.

In use, at the beginning of a cycle, the valve 162 is closed so that no air is supplied to the piston 86 for moving the metering arm 34 and hence the metering arm is in its fully clockwise position (as shown in FIG. 2), and valve 166 is actuated to supply air to the cylinder 148 so that the slide rod 40 is fully retracted (as shown in FIG. 1). Through appropriate control circuitry not shown, valve 162 is actuated to supply compressed air to move the piston 86 of fluid motor which rotates the metering arm counter-clockwise (as viewed in FIG. 2) so that the leading stud advances to and is restrained by the finger 78 of the metering arm. Preferably, but not necessarily, simultaneously, the valve 166 is actuated to cause the cylinder 148 to fully advance the slide rod 40 to the position shown in FIG. 3, which closes off the feeder inlet 28. As the slide rod approaches its fully advanced position, the inlet ports 140 communicate with the cavity 144 to discharge compressed air into the pilot passage 42 which propels the stud 12 received in its upper end head first through the tube 16 to the stake press or other power tool. Thereafter, valve 166 is actuated to cause the cylinder 148 to fully retract the slide rod 40 which stops the flow of compressed air through the pilot passage 42 and opens the inlet 28. Then control valve 162 is actuated to exhaust to the atmosphere the compressed air acting on the piston 86 so that it is advanced by the spring 96 to return the metering arm 42 to the clockwise position as shown in FIG. 2. This movement of the metering arm releases the leading stud and transfers it through the feeder inlet 28 into the passage 36 where it drops by gravity generally axially onto the upper end of the slide rod with its shank projecting into the pilot passage 42. This completes one cycle of the feed apparatus 10 which may then be cycled again to feed such stud head first through the hose 16 to the stake press and transfer another stud into the feed apparatus.

I claim:

1. An apparatus for transferring articles from a source of supply in which a succession of articles with heads and depending shanks are in side-by-side relation and feeding one article at a time head first and generally longitudinally through a conduit, said apparatus comprising: a housing, an axially elongate passageway carried by said housing and having an article outlet constructed and arranged for communicating said passageway generally coaxially with the conduit, an inlet to said passageway spaced from said outlet and opening into the side of said passageway through which an article may enter into said passageway with its axis oriented generally parallel to the axis of said passageway and its shank depending from its head, a slide rod received in said passageway and having a pilot passage extending generally axially and opening through one end into said passageway and constructed and arranged to receive the shank of an article therein, said slide rod being movable to an extended position to close said inlet and dispose said one end of said slide rod downstream of said inlet and to a retracted position to open said inlet and dispose said one end upstream of said inlet, a first drive for moving said slide rod to its extended and retracted positions, valve means operatively associated with said slide rod for discharging compressed gas into said pilot passage upstream of an article received therein when said slide rod is in its extended position to propel such article head first through said passageway outlet and the conduit, and to turn off such discharge of compressed gas at least when said slide rod is in its retracted position, metering means carried by said housing and constructed and arranged to feed one article at a time from the source of supply through said inlet and passageway and onto said slide rod with the shank of such article received in said pilot passage thereof when said slide rod is in its retracted position, and a second drive carried by said housing and constructed and arranged to actuate said metering means.

2. The apparatus of claim 1 wherein said valve means comprises a slide valve carried by said housing and having at least one inlet port in said slide rod communicating with said pilot passage upstream of a shank of a article received in said pilot passage.

3. The apparatus of claim 1 wherein said first drive comprises a fluid actuated cylinder having a piston rod operably connected to said slide rod for moving said slide rod to its extended and retracted positions.

4. The apparatus of claim 1 wherein said second drive comprises a fluid actuated motor operably connected to said metering means.

5. The apparatus of claim 1 wherein said metering means comprises a meter arm carried by said housing and having first and second fingers spaced apart and constructed and arranged so that when said arm is in a first position, one finger bears on the leading article of the succession of articles to prevent all of the articles from moving through said inlet and when said arm is moved to a second position, such one finger disengages the leading article to permit the leading article to move past such one finger and the other of said fingers is constructed and arranged so that when said arm is in such second position such other finger bears on one of the articles to prevent it from moving into said inlet, and said first and second fingers are constructed, arranged and spaced apart sufficiently so that when said arm is moved between first and second positions, the leading article is fed from the source of supply through said inlet, into said passageway and is received on said slide rod with its shank projecting into said pilot passage of said slide rod.

6. The apparatus of claim 1 which also comprises a sleeve removably received and releasably retained in a bore in said housing, said passageway extends generally axially through said sleeve and said metering means comprises, a meter arm removably received and journalled on said sleeve for rotational movement relative to said housing.

7. The apparatus of claim 1 which also comprises a bearing carried by said housing and journalling said slide rod for reciprocable movement to its extended and retracted positions, a sleeve removably received and releasably retained in a bore in said housing, said passageway extends generally axially through said sleeve, and said metering means comprises, a meter arm removably received and journalled on said sleeve for rotational movement relative to said housing.

8. The apparatus of claim 1 which also comprises a first sleeve removably received and releasably retained in a bore in said housing, said passageway extends generally axially through said first sleeve, a second sleeve removably carried by and releasably retained in said housing, said second sleeve being spaced from said first sleeve, a bearing carried by said second sleeve and journalling said slide rod for reciprocation to its extended and retracted and positions, and said metering means comprises, a meter arm removably received and journalled on said first sleeve for rotational movement relative to said housing.

9. The apparatus of claim 1 wherein said metering means comprises a meter arm carried by said housing and journalled for rotational movement relative to said housing, and said second drive comprises a cylinder in said housing, a piston slidably received in said cylinder, operably connected with said meter arm and constructed and arranged to rotate said meter arm from a first position to a second position in response to admission of a fluid at superatmospheric pressure into said cylinder.

10. The apparatus of claim 1 wherein said metering means comprises a meter arm carried by said housing for rotational movement relative to said housing, said meter arm having first and second fingers, one of said first and second fingers being constructed and arranged so that when said arm is in a first position such one finger bears on the leading articles of the succession of articles to prevent all of the articles from moving through said inlet and when said meter arm is moved to a second position, such one finger disengages the leading article to permit the leading article to move past such finger, and the other of said first and second fingers is constructed and arranged so that when said meter arm is in its first position such other finger is disengaged from the leading article in the succession of articles and when said meter arm is in its second position such other finger bears on one of the articles to prevent it and the succeeding articles in the succession of articles from moving through said inlet, and said first and second fingers are constructed, arranged and spaced apart sufficiently such that when said meter arm is moved back and forth between its first and second positions, one article at a time is fed from the source of supply through said inlet.

* * * * *